(No Model.)
J. A. BARRETT.
CABLE HANGER.
No. 358,140. Patented Feb. 22, 1887.
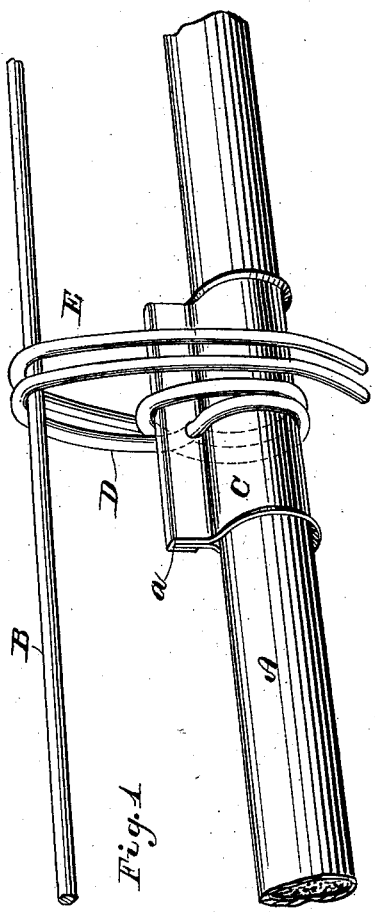
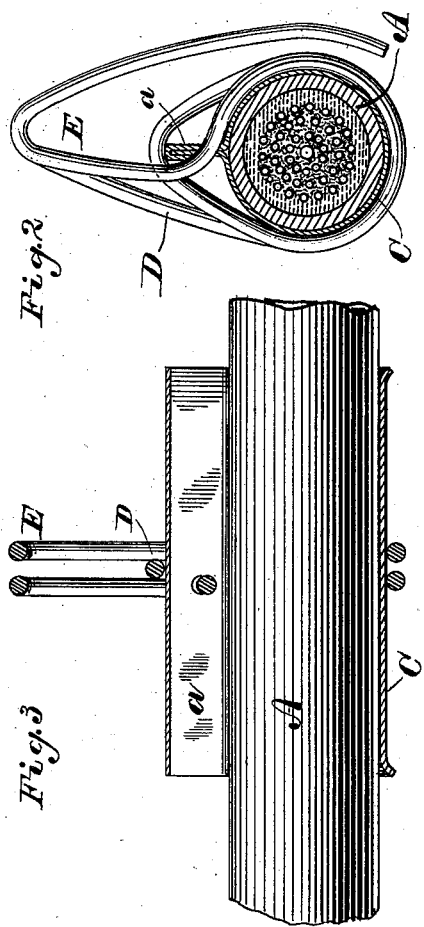

UNITED STATES PATENT OFFICE.

JOHN A. BARRETT, OF BROOKLYN, NEW YORK, ASSIGNOR TO THE WESTERN ELECTRIC COMPANY, OF CHICAGO, ILLINOIS.

CABLE-HANGER.

SPECIFICATION forming part of Letters Patent No. 358,140, dated February 22, 1887.

Application filed December 15, 1883. Serial No. 114,619. (No model.)

*To all whom it may concern:*

Be it known that I, JOHN A. BARRETT, a citizen of the United States, residing at Brooklyn, in the county of Kings and State of New York, have invented a certain new and useful Improvement in Cable-Hangers, of which the following is a full, clear, concise, and exact description, reference being had to the accompanying drawings, forming a part of this specification.

My invention relates to devices for suspending telegraph-cables; and it consist of a piece of sheet metal wrapped about the cable in the form of a sleeve and provided with a flange, and a single wire inserted through this flange and bent about the sleeve and the supporting-wire, as herein described and shown.

In the drawings, Figure 1 is a perspective view showing the manner of suspending a cable by my device. Fig. 2 is a transverse sectional view of the cable, showing the wire wrapped about the sleeve; and Fig. 3 is a longitudinal sectional view of the same.

Like parts are indicated by similar letters of reference throughout the several views.

In said drawings, A represents the cable, and B the ordinary supporting-wire, from which the cable is suspended. The sleeve C, through which the cable passes, is formed from a single piece of sheet metal, which is bent around the cable, its ends being sufficiently long to form, when brought together, as shown, a longitudinal rib or flange, a, one of said ends being lapped over the other, as shown.

In practice I find it most convenient to first insert the tie-wire through the hole provided in the flange a, and then wind the said tie-wire any desired number of times about the sleeve. Both ends of the wire D are now bent down, so as to form a loop or hook, E, a short distance above the top of the flange a.

To suspend the cable from the supporting-wire B, it is only necessary to pass the hook E over said supporting-wire, as shown in Fig. 1. The ends of the wire D which form the hook E may be sufficiently long to extend down below the center of the cable, thus rendering it exceedingly difficult for the hook to become accidentally displaced.

A cable-hanger thus formed is simple and inexpensive, and by the peculiar arrangement of the sleeve and wire a rigid connection is secured. There is thus but one loose joint between the cable and its supporting-wire—viz., the one between said supporting-wire and the hook. The hook being formed of both ends of the same wire, which passes entirely around the cable and through the flange of the sleeve, a very strong construction is secured, while the sleeve prevents any abrasion of the cable-covering by said wire.

Having thus described my invention, I claim as new and desire to secure by Letters Patent—

1. The combination, with the sleeve C, formed of a single piece of sheet metal the ends of which are brought together, forming a flange, a, of the wire D, wrapped about said sleeve and passed through said flange and having both ends thereof formed into a hook, E, substantially as and for the purpose specified.

2. The combination, with the sleeve C, provided with a flange, a, of a wire, D, wrapped about said sleeve and passed through said flange, said wire being provided with a hook, E, substantially as set forth.

In witness whereof I hereunto subscribe my name this 11th day of December, A. D. 1883.

JOHN A. BARRETT.

Witnesses:
ISAAC LUBLIN,
GEO. G. BARNARD.